US012586281B2

(12) United States Patent (10) Patent No.: US 12,586,281 B2
Marquis Bolduc et al. (45) Date of Patent: Mar. 24, 2026

(54) GENERATING MACHINE-LEARNED INVERSE RIG MODELS

(71) Applicant: Electronic Arts Inc., Redwood City, CA (US)

(72) Inventors: Mathieu Marquis Bolduc, Katy, TX (US); Hau Phan, Montreal (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 716 days.

(21) Appl. No.: 18/060,133

(22) Filed: Nov. 30, 2022

(65) Prior Publication Data

US 2023/0394734 A1 Dec. 7, 2023

Related U.S. Application Data

(60) Provisional application No. 63/349,358, filed on Jun. 6, 2022, provisional application No. 63/359,480, filed on Jul. 8, 2022.

(51) Int. Cl.
*G06T 13/40* (2011.01)
*A63F 13/57* (2014.01)
(Continued)

(52) U.S. Cl.
CPC .............. *G06T 13/40* (2013.01); *A63F 13/57* (2014.09); *G06T 7/251* (2017.01); *G06T 13/80* (2013.01);
(Continued)

(58) Field of Classification Search
CPC ......... G06T 13/40; G06T 13/80; G06T 7/251; G06T 2207/20081; G06T 2207/200084;
(Continued)

(56) References Cited

U.S. PATENT DOCUMENTS 10,198,845 B1 * 2/2019 Bhat .................... G06V 40/176
11,941,739 B1 * 3/2024 Radzihovsky ........ G06T 17/205
(Continued)

OTHER PUBLICATIONS

Fyffe, Graham, et al., Driving High-Resolution Facial Scans with Video Performance Capture, USC Institute for Creative Technologies, ACM TOG 34(1), 15 pages, dated Jan. 1, 2014.
Ghosh, Abhijeet, et al., Multiview Face Capture using Polarized Spherical Gradient Illumination, USC Institute for Creative Technologies, ACM TOG 30(6), 15 pages, dated Dec. 12, 2011.
Hahn, Fabian, et al., Rig-Space Physics, ACM Transactions on Graphics, vol. 31(4), Associated for Computing Machinery, 11 pages, dated Jul. 2012.
(Continued)

*Primary Examiner* — James S. McClellan
(74) *Attorney, Agent, or Firm* — Gray Ice Higdon

(57) ABSTRACT

A computer-implemented method for generating a machine-learned inverse rig model. The machine-learned inverse rig model outputs rig parameters for a facial animation rig used to generate animations of facial expressions in video games. The method comprises receiving one or more training examples. Each training example comprises target mesh data for a face portraying a particular facial expression. For each training example, predicted rig parameters are generated using an inverse rig model, comprising processing the target mesh data of the training example. Predicted mesh data is generated, comprising processing the predicted rig parameters using a forward rig model. A loss is determined, comprising performing a comparison between the predicted mesh data and the target mesh data. The inverse rig model is trained, comprising updating parameters of the inverse rig model based on the losses of one or more training examples.

14 Claims, 7 Drawing Sheets

(51) Int. Cl.

| | |
|---|---|
| *G06T 7/246* | (2017.01) |
| *G06T 13/80* | (2011.01) |
| *G06T 17/20* | (2006.01) |

(52) U.S. Cl.
CPC .... *G06T 17/20* (2013.01); *G06T 2207/20081* (2013.01); *G06T 2207/20084* (2013.01); *G06T 2207/30201* (2013.01)

(58) Field of Classification Search
CPC . G06T 2207/30201; A63F 13/56; A63F 13/57
See application file for complete search history.

(56) References Cited

U.S. PATENT DOCUMENTS

| | | | | |
|---|---|---|---|---|
| 2013/0127853 | A1* | 5/2013 | Corazza | G06T 15/08 |
| | | | | 345/420 |
| 2020/0051303 | A1* | 2/2020 | Li | G06N 3/045 |
| 2020/0357157 | A1* | 11/2020 | Edwards | G06T 7/50 |
| 2021/0019928 | A1* | 1/2021 | Borer | G06N 3/04 |
| 2021/0233300 | A1* | 7/2021 | Borer | G06N 3/09 |
| 2022/0358722 | A1* | 11/2022 | Li | G06V 10/25 |

OTHER PUBLICATIONS

Holden, D., et al., Learning Inverse Rig Mappings by Nonlinear Regression, University of Edinburgh, IEEE Transactions on Visualization and Computer Graphics, 14 pages, dated 2017.

Holden, Daniel, et al., Learning Inverse Rig Mapping for Character Animation, 14th ACM SIGGRAPH, 13 pages, dated Aug. 7, 2015.

Rackovic, Stevo, et al., Clustering of the Blendshape Facial Model, arXiv:2110.15313v1, 6 pages, dated Oct. 5, 2021.

Rackovic, Stevo, et al., Accurate, Interpretable, and Fast Animation: An Iterative, Sparse, and Nonconvex Approach, arXiv:2109.08356v2, 13 pages, dated Sep. 20, 2021.

Gustafson, Stephen, et al., Analytically Learning an Inverse Rig Mapping, SIGGRAPH 20 Talks, 2 pages, dated Aug. 17, 2020.

Seol, Yeongho, et al., Tuning Facial Animation in a Mocap Pipeline, SIGGRAPH, 1 page, dated Aug. 10, 2014.

Song, Steven L., et al., Accurate Face Rig Approximation with Deep Differential Subspace Reconstruction, arXiv:2006.01746v2, 12 pages, dated Aug. 18, 2020.

Goodfellow, et al., Deep Learning, MIT, Retrieved from: https://www.deeplearningbook.org/, p. 507, 3 pages, dated 2016.

Usama, Muhammad, et al., Towards Robust Neural Networks with Lipschitz Continuity, Korea Advanced Institute of Science and Technology, arXiv:1811.09008v1, 18 pages, dated Nov. 22, 2018.

\* cited by examiner

100

Computing System 101

Gaming Application 102

Animations 103

Animation Computing System 104

Animation Rig 105

Machine-Learned Inverse Rig Model 106

Training System 107

Forward Rig Model 108

Forward Rig Training Examples 109

Inverse Rig Training Examples 110

600

Receive one or more training examples, each training example comprising target mesh data 6.1

6.2

For each training example:

Generate predicted rig parameters using inverse rig model 6.2.1

Generate predicted mesh data using forward rig model 6.2.2

Determine loss 6.2.3

Train inverse rig model 6.3

700

Volatile memory    704

Processor
arrangement    702

Non-volatile
memory    706

O.I

708

GENERATING MACHINE-LEARNED INVERSE RIG MODELS

Generating animations of objects such as faces in video games often involves the use of a rig that provides controls (also known as "rig parameters") for animating the video game object. In some cases, it may be desirable to be able to determine the animation controls for objects, e.g., from capture data of real-world objects, from animations of objects where the animations were generated without using the rig, etc.

SUMMARY

In accordance with a first aspect, this specification provides a computer-implemented method for generating a machine-learned inverse rig model. The machine-learned inverse rig model outputs rig parameters for a facial animation rig used to generate animations of facial expressions in video games. The method comprises receiving one or more training examples. Each training example comprises target mesh data for a face portraying a particular facial expression. For each training example, predicted rig parameters are generated using an inverse rig model, comprising processing the target mesh data of the training example. Predicted mesh data is generated, comprising processing the predicted rig parameters using a forward rig model. A loss is determined, comprising performing a comparison between the predicted mesh data and the target mesh data. The inverse rig model is trained, comprising updating parameters of the inverse rig model based on the losses of one or more training examples.

In some implementations, the target mesh data of one or more training examples are obtained from capture data of a real face.

In some implementations, the forward rig model comprises a machine-learned model that has been trained to generate mesh data from input rig parameters. The forward rig model may be trained by receiving one or more initial training examples. Each initial training example may comprise: (i) input rig parameters, and (ii) associated target mesh data for the input rig parameters. The input rig parameters may define a configuration of the facial animation rig corresponding to the target mesh data. For each initial training example, predicted mesh data may be generated, comprising processing the input rig parameters using the forward rig model. A loss may be determined, comprising performing a comparison between the predicted mesh data and the target mesh data. Parameters of the forward rig model may be updated based on the losses of one or more initial training examples. The inverse rig model and/or forward rig model may comprise a neural network without any normalization layers.

In some implementations, the forward rig model comprises a differentiable function obtained by extracting, from the facial animation rig, operations used to transform the rig parameters into mesh data. The operations may be converted into a sequence of differentiable subfunctions.

In some implementations, the method further comprises performing a plurality of training iterations using the one or more training examples to obtain a trained inverse rig model. For each training example, rig parameters may be determined by processing the target mesh data of the training example using the trained inverse rig model. The determined rig parameters of each training example may be stored.

In some implementations, the method further comprises performing a plurality of training iterations using the one or more training examples to obtain a trained inverse rig model.

One or more inputs for the trained inverse rig model may be received. Each input may comprise target mesh data for a face portraying a particular facial expression. For each input, rig parameters may be determined by processing the target mesh data of the input using the trained inverse rig model. The determined rig parameters of each input may be stored.

In some implementations, each of the target mesh data and the predicted mesh data comprise vertex data, the vertex data comprising co-ordinate information for each of a plurality of corresponding vertices. Determining a loss for each training example may comprise determining a mesh loss, comprising determining a distance between each pair of vertices that correspond to each other in the target mesh data and the predicted target mesh data. Determining a loss may comprise determining a continuity loss, comprising generating perturbed target mesh data. Generating perturbed target mesh data may comprising perturbing the target mesh data with noise. Perturbed predicted rig parameters may be generated, comprising processing the perturbed target mesh data using the inverse rig model. The continuity loss may be determined based on: (i) a comparison between the perturbed predicted rig parameters and the predicted rig parameters, and (ii) a comparison between the perturbed target mesh data and the target mesh data. The loss may be determined based on a combination of the mesh loss and the continuity loss.

In some implementations, generating, for each training example, predicted rig parameters using the inverse rig model comprises determining target blend shape weights for the target mesh data. Each target blend shape weight may be associated with a particular blend shape. A weighted sum of the blend shapes using the target blend shape weights may represent the target mesh data. The target blend shape weights may be processed using the inverse rig model to generate the predicted rig parameters. Generating predicted mesh data for each training example may comprise processing the predicted rig parameters using the forward rig model to generate predicted blend shape weights for the blend shapes. The predicted mesh data may be generated using a weighted sum of the blend shapes, comprising weighting each blend shape by a respective weight of the predicted blend shape weights and summing together the weighted blend shapes.

In accordance with a second aspect, this specification provides a computing system comprising one or more computing devices configured to receive one or more training examples. Each training example comprises target mesh data for a video game object. The target mesh data specifies a configuration of a shape of the video game object. For each training example, predicted rig parameters are generated using an inverse rig model, comprising processing the target mesh data of the training example. Predicted mesh data is generated, comprising processing the predicted rig parameters using a forward rig model. A loss is determined, comprising performing a comparison between the predicted mesh data and the target mesh data. The inverse rig model is trained, comprising updating parameters of the inverse rig model based on the losses of one or more training examples.

In some implementations, each of the target mesh data and the predicted mesh data comprise vertex data, the vertex data comprising co-ordinate information for each of a plurality of corresponding vertices. Determining a loss for each training example may comprise determining a mesh loss, comprising determining a distance between each pair of vertices that correspond to each other in the target mesh data and the predicted target mesh data. Determining a loss may comprise determining a continuity loss, comprising generating perturbed target mesh data. Generating perturbed target mesh data may comprising perturbing the target mesh data with noise. Perturbed predicted rig parameters may be generated, comprising processing the perturbed target mesh data using the inverse rig model. The continuity loss may be determined based on: (i) a comparison between the perturbed predicted rig parameters and the predicted rig parameters, and (ii) a comparison between the perturbed target mesh data and the target mesh data. The loss may be determined based on a combination of the mesh loss and the continuity loss.

In some implementations, the target mesh data of one or more training examples are obtained from capture data of a real-world object.

In accordance with a third aspect, this specification provides a non-transitory computer-readable medium containing instructions, which when executed by one or more processors, cause the one or more processors to perform a method comprising receiving one or more training examples. Each training example comprises target mesh data for a video game object. The target mesh data specifies a configuration of a shape of the video game object. For each training example, predicted rig parameters are generated using an inverse rig model, comprising processing the target mesh data of the training example. Predicted mesh data is generated, comprising processing the predicted rig parameters using a forward rig model. A loss is determined, comprising performing a comparison between the predicted mesh data and the target mesh data. The inverse rig model is trained, comprising updating parameters of the inverse rig model based on the losses of one or more training examples.

In accordance with a fourth aspect, this specification provides a computer-implemented method for enhancing mesh data specifying the shape of at least a part of video game object. Predicted rig parameters are generated based on the mesh data, using a machine-learned inverse rig model. Enhanced mesh data is generated based on the predicted rig parameters.

In some implementations, the machine-learned inverse rig model has been trained to generate rig parameters for an animation rig, The enhanced mesh data may be generated by applying the predicted rig parameters to the animation rig.

In some implementations, the mesh data is for a face portraying a particular facial expression.

DESCRIPTION

General Definitions

Figure 1:
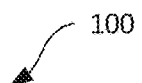
FIG. 1 is a schematic block diagram illustrating an example of a computing system configured to generate a machine-learned inverse rig model.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "client", as used in some embodiments described herein, is a software application with which a user interacts, and which can be executed on a computing system or device locally, remotely, or over a cloud service.

A "server", as used in some embodiments described here, is a software application configured to provide certain services to a client, e.g. content and/or functionality.

A "video game", as used in some embodiments described herein, is a virtual interactive environment in which players engage. Video game environments may be facilitated through a client-server framework in which a client may connect with the server to access at least some of the content and functionality of the video game.

A "mesh", as used in some embodiments described herein, is a collection of vertices and/or edges and/or other elements that describes the shape of an object, or part of an object, in a video game. A mesh may be a polygon mesh, such as a triangle mesh, wherein vertices are arranged in polygons to form the surface of the shape.

"Mesh data", as used in some embodiments described herein is data defining a configuration (e.g. the 3D shape) of at least part of a mesh. Mesh data may for example specify the position of elements of the mesh such as vertices and/or edges. In some examples, mesh data may define the configuration (e.g. shape) of a mesh by specifying a deformation or transformation from a default/neutral mesh configuration.

"Rigging", as used in some embodiments described herein, is a technique that provides controls for animating a video game object. An animation rig (also referred to herein as simply a "rig") may be provided which defines the logic (e.g. a set of rules) by which the controls (also referred to herein as "rig parameters") are transformed into mesh data for the video game object. A rig may be skeletal-based, wherein the controls define the configuration (e.g. rotation) of various joints of a skeleton, and the mesh is generated/deformed based on the configuration of the joints. Additionally or alternatively, the rig may be based on blend shapes (or any other suitable set of basis shapes) that define modifications of the mesh (e.g. from a default/neutral configuration of the mesh), wherein the controls define how different blend shapes are combined. A weight may be determined for each of the blend shapes from the controls, and the mesh may be generated using the blend shapes and their respective weights.

A "rig model", as used in some embodiments described herein, (also referred to herein as a "forward rig model" or a "rig-to-mesh" model) is a model for generating mesh data based on rig parameters. As described in more detail below, a rig model may for example comprise a differentiable function which has been extracted from the animation rig, or it may comprise a machine-learned model.

An "inverse rig model" (also referred to herein as a "mesh-to-rig" model) is a model configured to generate rig parameters based on mesh data. Various embodiments described herein relate to generating a machine-learned inverse rig model.

This specification describes systems and methods for generating a machine-learned inverse rig model, wherein the machine-learned inverse rig model processes a target mesh (or data derived therefrom) of a video game object and outputs rig parameters. The rig parameters are controls for an animation rig that is used to generate animations of the video game object. In particular, the described systems and methods make use of a forward rig model during training of the inverse rig model to obtain a mesh loss. The mesh loss compares the input target mesh to a mesh generated by the forward rig model using the output rig parameters. Inverse rig models trained using mesh losses as described herein generate more appropriate (e.g. more accurate) rig parameters than inverse rig models trained without mesh losses (e.g. models that are trained mainly using losses comparing target rig parameters and predicted rig parameters). As a result, the generated meshes are more accurate (i.e., more closely matching the target mesh input to the machine-learned inverse rig model) than those obtained by other machine-learning approaches to performing rig inversion.

Furthermore, the described systems and methods can be used to generate machine-learned inverse rig models for a wide variety of rigs, including more complex rigs. Existing approaches to performing rig inversion tend to scale poorly (e.g., consume disproportionately more computing resources as the number of rig parameters involved in the rig grows) and/or generate unsuitable rig parameters for complex rigs.

For example, other machine-learning approaches to performing rig inversion may attempt to directly optimize in rig parameter space using loss functions that compare predicted rig parameters with target rig parameters. However, it is often the case that different rig parameters vary in influence with regard to the resulting mesh output. For example, small changes in one rig parameter may lead to a large variation in resulting meshes (e.g. a rig parameter controlling a jawbone position), whereas large changes in another rig parameter may lead to a small variation in resulting meshes (e.g. a rig parameter controlling a flaring of nostrils). Machine learning models that are trained to optimize in rig parameter space may be trained using loss functions that weight each rig parameter equally. These models may be unable to capture the varying influence of different rig parameters. For example, these models may regard a small fluctuation in a highly influential rig parameter to have the same effect as a small fluctuation in a less influential rig parameter, whereas the resulting meshes may be vastly different in each case.

In contrast, the machine-learned inverse rig models described herein are trained using mesh losses, enabling the importance of different rig parameters to be implicitly learned based on the meshes themselves, resulting in more appropriate rig parameters being determined and more accurate meshes being generated therefrom.

Complex rigs may present further challenges that are inadequately handled by existing approaches in performing rig inversion. For example, a rig may be such that different settings of the rig parameters each result in the same, or similar, mesh being generated by the rig. As another example, in some situations it may not be possible to adequately represent some desired mesh(es) using any setting of the rig parameters.

These challenges present difficulties in generating a suitable inverse rig model. For example, inverse rig models that are trained to directly optimize in rig parameter space require ground-truth rig parameters as training labels. Target meshes that are the same, or very similar to each other, may be present in the training data with differing ground-truth rig parameters. The training of these inverse rig models may lead to an average of the differing ground-truth rig parameters being generated as output for the target meshes that are similar. However, the resulting mesh generated using the averaged ground-truth rig parameters may poorly match the target meshes of the training examples. Furthermore, there may be target meshes for which no exact ground-truth rig parameters can be determined, thus preventing these inverse rig models being trained using the target meshes.

On the other hand, the inverse rig models described herein can be trained on target meshes without requiring corresponding ground-truth rig parameters, thereby alleviating both challenges.

The systems and methods described herein also enable inverse rig models that generate similar outputs (rig parameters) for similar inputs (target meshes/data derived therefrom). This may be achieved by enforcing constraints on the outputs of the inverse rig model during training (e.g. continuity constraints).

This property is especially useful for animation, wherein rig parameters for target meshes from the same temporal sequence are desired to be obtained. Generally, consecutive target meshes in a temporal sequence are not expected to exhibit large, potentially discontinuous, jumps/differences in the meshes. As such, rig parameters determined for consecutive target meshes should ideally not exhibit large jumps/differences either. As described above however, different settings of the rig parameters may lead to the same/similar mesh being generated by the rig. As a result, existing approaches in performing rig inversion may generate rig parameters for consecutive target meshes that are not smooth, e.g. the generated rig parameters may oscillate between the different settings of the rig parameters. This presents challenges when using the generated rig parameters, for example it may be difficult for animators to modify/edit rig parameters generated for an animation sequence without degrading the quality of generated meshes.

In contrast, the methods and systems described herein enable temporally coherent rig parameters to be generated (i.e. rig parameters that are sufficiently smooth for consecutive target meshes of a temporal sequence), allowing animators to easily edit rig parameters generated for an animation sequence in a consistent manner.

Machine-learned inverse rig models generated according to the methods and systems described herein can be used for a variety of different applications.

For example, for "offline" use, the inverse rig model may be trained to optimize for (e.g. by overfitting) a training set of target meshes for which rig parameters are desired. In these settings, the inverse rig model may be discarded after the training is complete and rig parameters have been generated for all of the target meshes. This is useful for situations where all of the target meshes (for which rig parameters are desired) have already been provided, e.g. for one or more animation sequences and/or capture data sequences that have been obtained. By optimizing for the training set, the inverse rig model has been trained to generate appropriate rig parameters for the target meshes of the training examples. Therefore, the resulting meshes generated using the rig parameters closely match the target meshes of the training examples.

As another example, the inverse rig model may be trained for "online" use. In these settings, all of the target meshes for which rig parameters are desired might not be provided before the training of the inverse rig model. The inverse rig model may be trained to generalize well so that appropriate rig parameters can be determined for "unseen" target meshes (i.e. target meshes that were not present in the training set used to train the inverse rig model). This may be achieved by using a training set comprising a large variety of possible meshes.

Inverse rig models generated according to the methods and systems described herein can process (during training and/or inference) target meshes which are not captured by the rig. In other words, for these target meshes, there might not exist rig parameters that can be processed by the rig to generate a mesh that exactly matches the target mesh. As a result, the inverse rig model can be applied to noisy target meshes obtained from different sources (e.g. from capture data of a real-world object, from animations of an object that has been generated without using the rig, etc.) to obtain rig parameters that best approximate the noisy target mesh when applied to the rig. In this way, the inverse rig model can be used to enhance the quality of a lower quality (e.g. noisy) mesh, so as to provide a higher quality (e.g. denoised) mesh.

Other applications of machine-learned inverse rig models generated in accordance with the methods and systems described herein can include mesh compression and rig debugging.

Generally, rig parameters for a target mesh are much smaller in size than the target mesh itself, and therefore take up less storage. Compression of the target mesh can be performed by storing the rig parameters generated for the target mesh, instead of the target mesh data itself. This can be used to reduce the storage size of animations in video game applications. For example, a video game application may include the rig and/or a forward rig model to decompress stored rig parameters and obtain corresponding meshes.

Rig debugging can be performed by applying a wide variety of target meshes (which do not need to be generated using the rig) to the machine-learned inverse rig model and assessing meshes generated by the rig using rig parameters output from the inverse rig model. This can help to identify weaknesses in the rig, e.g. if generated meshes fail to capture certain aspects of the target meshes. Thus, the machine-learned inverse rig model can be used to improve animation rigs.

FIG. 1 is a schematic block diagram illustrating an example 100 of a computing system 101 configured to generate a machine-learned inverse rig model 106. The machine-learned inverse rig model 106 receives target meshes (or data derived therefrom) for a video game object and generates rig parameters for animation rig 105. The animation rig 105 provides controls in the form of rig parameters for animating the video game object. It will be understood that a suitable animation rig 105 can be provided for any appropriate video game object, using known rigging techniques. In one example, the video game object is a face and the animation rig 105 is a facial animation rig used to generate facial expressions for the face. Any of the functionality described as being performed by a specific component of the system 101 may instead be performed across a number of components, and/or functionality described as being performed by multiple components may be performed on a single component.

The computing system 101 includes gaming application 102 configured to provide a video game. Gaming application 102 includes a game engine (not displayed). The game engine can be configured to execute aspects of the operation of the gaming application 102 according to game rules.

Examples of game rules can include rules for scoring, possible inputs, actions/events, movement in response to inputs, and the like. The game engine may receive inputs (provided by a user and/or by other components of the system 101) and determine in-game events, such as actions, jumps, runs, throws, attacks, and other events appropriate for the gaming application 102. During runtime operation, the game engine can read user inputs, in-game data, and game state information to determine the appropriate in-game events. This can include causing one or more animations 103 stored as part of the gaming application 102 to be rendered and displayed.

Animations 103 provide a sequence of video frames displaying one or more video game objects. The animations 103 may be stored in any appropriate format. For example, the animations 103 may be stored as mesh data, texture data, pixel data, and/or compressed representations thereof. Mesh data may specify the positions of a collection of vertices in a 3D space, representing the shape of a particular video game object. Texture data may specify the appearance of a video game object which may be represented by a mesh. Texture data may be stored in the form of an image. Pixel data may specify color and/or light intensity values for each pixel of a video frame that is rendered for display by the gaming application 102. A compressed representation of mesh data may be provided in the form of rig parameters for an animation rig 105 that provides controls for animating a video game object. To decompress the rig parameters and provide a mesh, the gaming application 102 may include the animation rig 105 and/or a forward rig model 108. Other compression methods are contemplated, e.g. for image data such as pixel data and/or texture data, conventional image compression methods (e.g. JPEG compression) and/or block compression methods may be used.

The computing system includes an animation system 104 that is used/accessed by animators to produce animations 103 for the gaming application 102. The animation system 104 typically includes an animation application (not displayed) that provides a graphical user interface for animators to interact with when producing animations 103. Animation applications may provide functionality for creating and editing animation rigs 105, and for generating animation sequences using animation rigs 105.

The animation system 104 provides one or more animation rigs 105. Different animation rigs 105 may be used to generate animations for different video game objects. For example, a first animation rig 105 may be used to generate animations of facial expressions, another animation rig 105 may be used to generate animations for a character model, etc.

The animation rig 105 provides controls for animating a particular video game object. The controls (also referred to herein as "rig parameters") are transformed by the animation rig 105 to determine a corresponding mesh for the video game object. The animation rig 105 may be skeletal-based, wherein the controls define the configuration (e.g. rotation) of various joints of a skeleton and the mesh is generated/deformed based on the configuration of the joints. Additionally or alternatively, the animation rig 105 may be based on blend shapes (or any other suitable set of basis shapes) that define modifications of the mesh (e.g. from a default/neutral configuration of the mesh), wherein the controls define how different blend shapes are combined. A weight may be determined for each of the blend shapes from the controls, and the mesh may be generated using the blend shapes and their respective weights.

One or more rig parameters of the animation rig 105 may be used for positioning a skeleton of a three-dimensional model of a video game object. The one or more rig parameters may describe the positions and/or orientations of interconnected bones/joints forming the skeleton of the three-dimensional model. The skeleton may be a hierarchical set of joint objects used to represent more complex structures to drive deformation of a three-dimensional mesh for the video game object. The one or more rig parameters may include one or more of the following parameter types: joint parameters, where a joint is a representation of a point in 3D space with the parameters defining a transform that is used to deform a mesh; blend shape parameters, where a blend shape is a set of delta position offsets for a subset of vertices making up a mesh; and controller node parameters, where a controller might be a single numeric attribute that drives multiple outputs. For example, the numerical attribute may be shown by a slider and control both a joint rotation and a blend shape weight value. The numerical attribute may have a value between −1.0 and 1.0 which is mapped on to a joint rotation range of between −45 and +45 degrees and a blend shape weight range of between 0 and 1.

Meshes generated by the animation rig 105 describe the shape of the video game object in a three-dimensional space. For example, the mesh may include a plurality of vertex positions of a three-dimensional model of the video game object. The plurality of vertex positions may be specified as vertex coordinates or as displacements of the vertices from their positions in a default/neutral mesh for the video game object.

Additionally or alternatively, the animation rig 105 may represent a mesh in the form of blend shape weights. Each weight of the blend shape weights is associated with a particular blend shape. Each blend shape specifies a plurality of vertex positions of a three-dimensional model of a video game object and so different blend shapes may specify different configurations for the shape of the video game object. The plurality of vertex positions of the blend shapes may be specified as vertex coordinates or as displacements of the vertices from their positions in a default/neutral mesh for the video game object. A mesh may be generated from the blend shape weights by calculating a weighted sum of the blend shapes, wherein each blend shape is weighted in the sum by its respective weight. The result of the weighed sum may be added together with a default/neutral mesh to generate the final mesh. Blend shapes may be provided in any appropriate manner, e.g. they may be defined by animators and/or may be generated by a data-driven process based on shape data for different configurations of the video game object, etc.

Animation system 104 includes a machine-learned inverse rig model 106. As will be described in further detail in relation to FIG. 2, the machine-learned inverse rig model 106 is used to determine rig parameters for the animation rig 105 based on a target mesh. A target mesh specifies the configuration of the shape of a video game object for which corresponding rig parameters are desired. The target mesh may be obtained by any suitable means. For example, the target mesh may be obtained from capture data of a real-world object corresponding to the video game object. Additionally or alternatively, target meshes can be obtained from animations of the video game object, where the animations were generated without using the animation rig 105.

The computing system 101 includes a training system 107 that is used to train the machine-learned inverse rig model 106 to generate rig parameters from target meshes. The training system 107 uses inverse rig training examples 110 to train the inverse rig model 106. Each inverse rig training example 110 comprises a target mesh defining a shape of the video game object. The training of the machine-learned inverse rig model 106 is described in further detail in relation to FIG. 3.

The training system 107 provides a forward rig model 108. The forward rig model 108 is used during training of the inverse rig model 106 to provide a differentiable rig function that generates meshes from rig parameters. As a result, the inverse rig model 106 can be trained used mesh losses that compare predicted/generated meshes with target meshes, wherein the predicted meshes are generated by the forward rig model using rig parameters generated by the inverse rig model 106.

The forward rig model 108 may comprise a machine-learned model that has been trained to generate meshes from rig parameters, thereby approximating the animation rig 105. In these implementations, the forward rig model 108 may be trained using forward rig training examples 109 prior to the training of the inverse rig model 106. Each forward rig training example 109 comprises rig parameters and a corresponding target mesh, wherein the target mesh of a training example is obtained by applying the rig parameters of the training example to the animation rig 105. The training of the forward rig model 108 for these implementations is described below in greater detail with reference to FIG. 4.

Additionally or alternatively, the forward rig model 108 may comprise a differentiable function that has been obtained/extracted from the animation rig 105. For example, the logic of the animation rig 105 that transforms rig parameters to meshes may be analyzed to determine the operations that perform the transformation. The operations may be converted into a sequence of differentiable subfunctions. The differentiable subfunctions may include parameterized linear/affine transformations, and the parameters of the transformations may be determined from the logic of the animation rig 105. By extracting a differentiable function from the animation rig 105, a forward rig model 108 can be obtained without requiring a training process using forward rig training examples 109.

Figure 2:
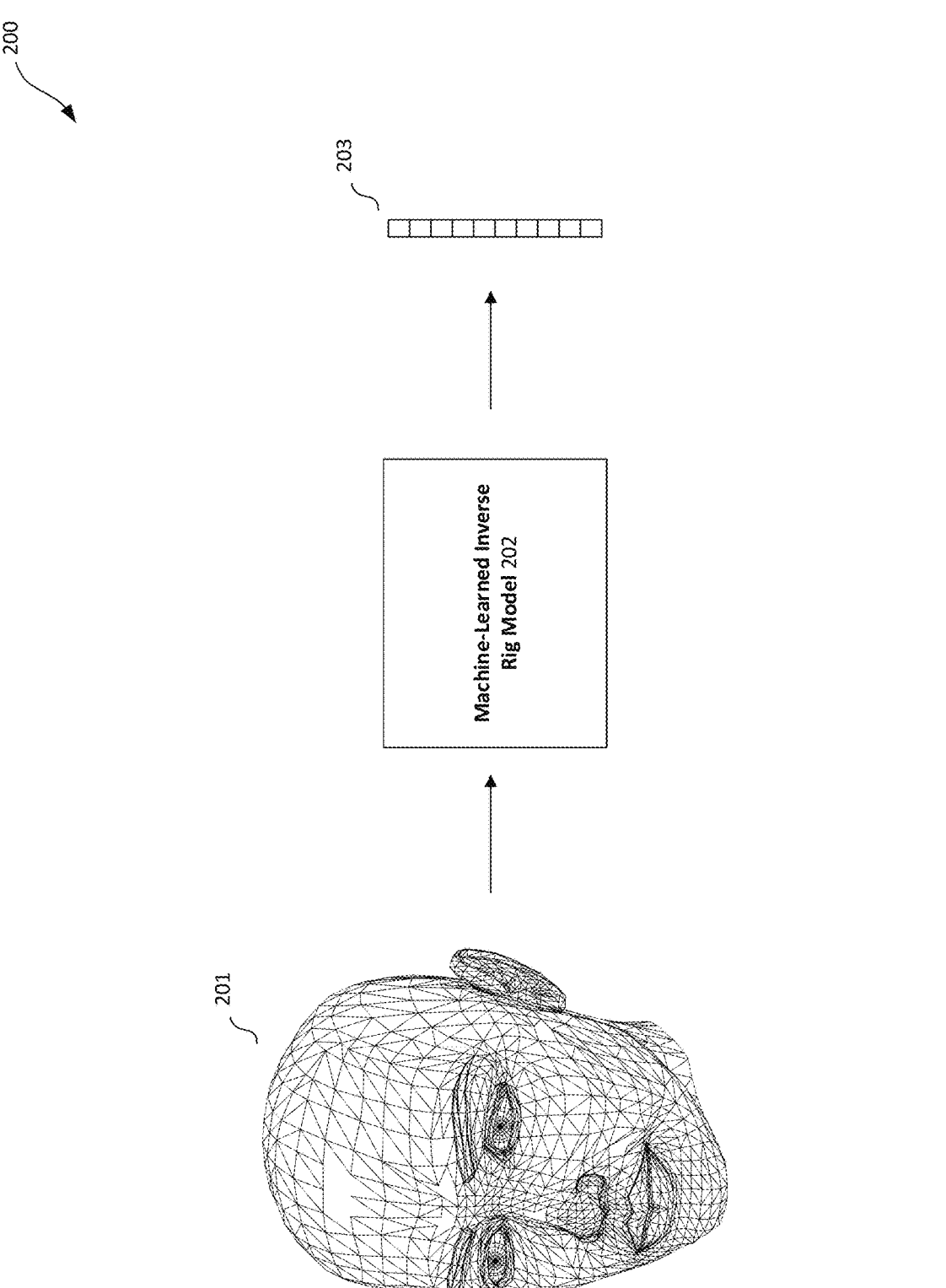
FIG. 2 illustrates an example method for determining rig parameters for facial mesh using a machine-learned inverse rig model.
Figure 3:
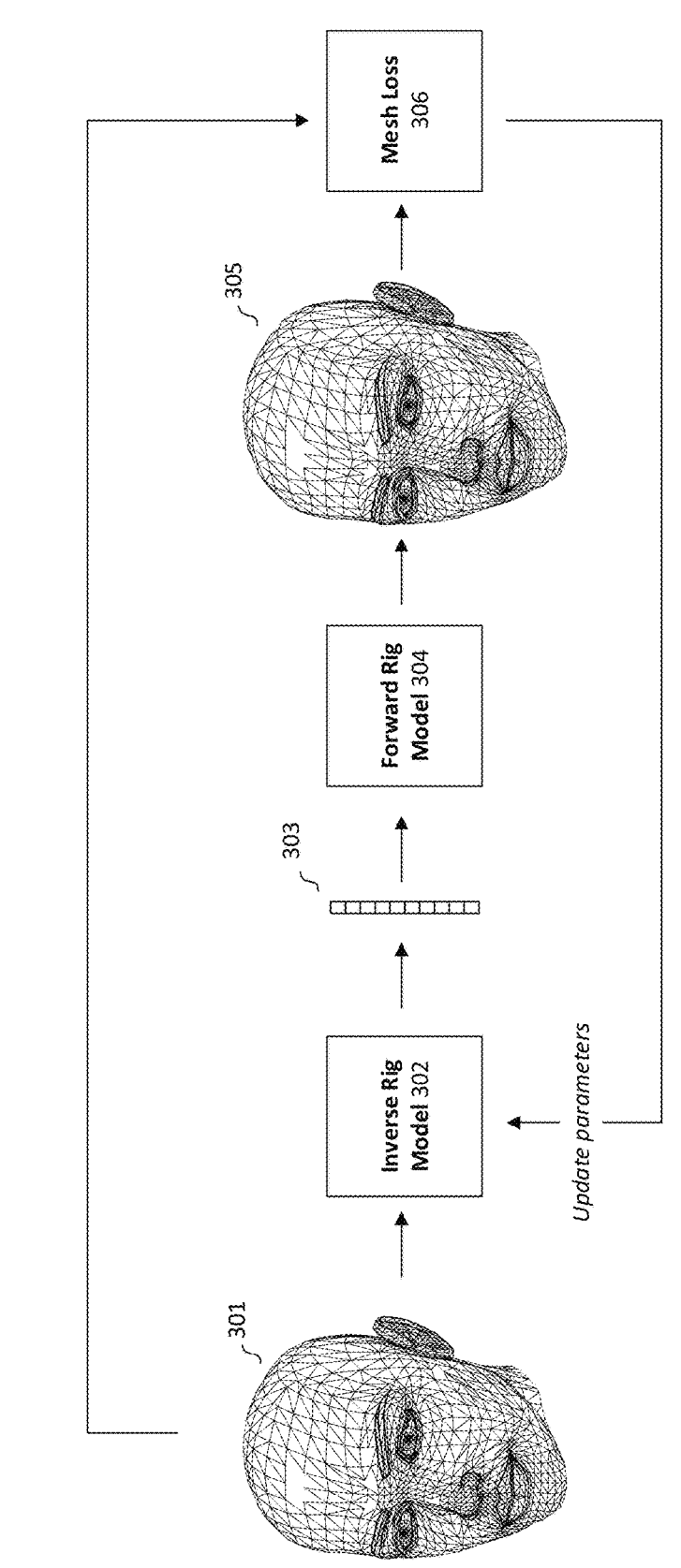
FIG. 3 illustrates an example method for training an inverse rig model using a forward rig model.
Figure 4:
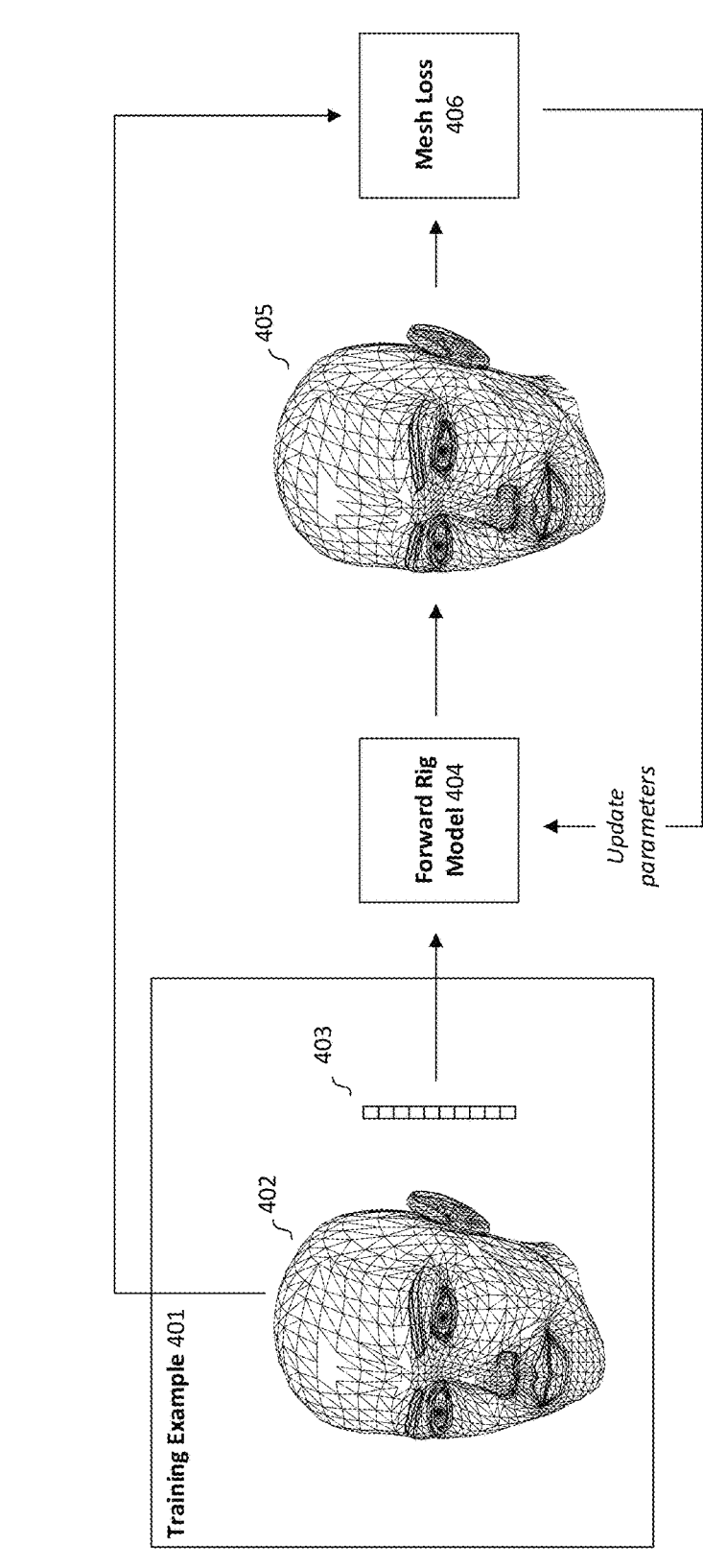
FIG. 4 illustrates an example method for training a forward rig model.

The methods and systems described herein are particularly useful for generating machine-learned inverse rig models for facial animation rigs, wherein the video game object is a face, and the facial animation rig provides controls for animating facial expressions. FIGS. 2-4 illustrate example methods being applied for facial animation rigs, however it will be appreciated that the methods can be applied to animation rigs providing animation controls for any suitable video game object.

FIG. 2 illustrates an example method 200 for determining rig parameters 203 for a facial mesh 201 using a machine-learned inverse rig model 202. The determined rig parameters 203 are generated to provide an input to a facial animation rig, where the facial animation rig generates a corresponding facial mesh. The facial mesh 201 may be referred to as a target mesh, as it is desired to determine rig parameters 203 that can be used to generate a facial mesh closely matching the target facial mesh 201. The facial mesh 201 may be obtained by any suitable means. For example, the facial mesh 201 may be obtained from capture data of a real-world face. Additionally or alternatively, facial meshes 201 can be obtained from facial animations which were generated without using a facial animation rig.

The facial mesh 201 describes the surface shape of a face in a three-dimensional space, defining the position/configuration of various facial elements such as noses, eyes, ears, mouths, lips, jaws, and skin. For example, the facial mesh 201 may include a plurality of vertex positions of a three-dimensional facial model. The plurality of vertex positions may be specified as vertex coordinates or as displacements of the vertices from their positions in a default/neutral facial mesh. For example, the default/neutral facial mesh may portray a neutral expression for the face.

The facial mesh 201 may initially be represented in the form of a matrix. For example, the facial mesh 201 may specify a three-dimensional coordinate for N vertices, and thus initially be represented as a matrix of dimension N×3. The initial matrix representation may be converted into a vector representation for processing by the machine-learned inverse rig model, wherein the vector is of length 3N. This may be performed in any suitable manner. For example, for a facial mesh including vertex positions for vertices $p=(p_x, p_y, p_z)$ and $q=(q_x, q_y, q_z)$, a vector f representing the facial mesh may be provided as $f=[\ldots, p_x, p_y, p_z, q_x, q_y, q_z, \ldots]$, or $f=[\ldots, p_x, q_x, \ldots, p_y, q_y, \ldots, p_z, q_z, \ldots]$, or any other suitable representation that is consistently applied between facial meshes 201.

In some implementations, the facial mesh 201 may be pre-processed before input to the machine-learned inverse rig model 202. For example, weights for blend shapes may be determined for the facial mesh 201, and the determined weights may form the input to the machine-learned inverse rig model. Each blend shape may be represented as a vector, as described above for the facial mesh 201. A default/neutral blend shape may be indicated by $b^{(0)}$. A collection of M blend shapes $b^{(1)}, \ldots, b^{(M)}$ may be represented as a matrix $B=[b^{(1)}, \ldots, b^{(M)}]$ of dimension 3N×M, where each blend shape includes vertex positions for N vertices in 3D space. Given a vector representation of the facial mesh 201, f, the equation $f=b^{(0)}+Bw$ can be solved to determine w, where w is a vector of length M with the $m^{th}$ element, $w_m$, specifying a weight for the $m^{th}$ blend shape $b^{(m)}$.

The machine-learned inverse rig model 202 processes facial mesh 201 (or data derived therefrom, such as blend shape weights) and generates predicted rig parameters 203. The machine-learned inverse rig model 202 may comprise a neural network comprising a plurality of neural network layers, each neural network layer associated with a set of weights. The neural network layers may include fully connected layers, convolutional layers, Transformer encoders/decoders, etc. In some implementations, the neural network layers may utilize non-linear activation functions which encourage sparsity in the generated rig parameters, as this may more accurately reflect the types of rig parameters used by animators. For example, a ReLU activation function may be used for hidden layers of the neural network. An output neural network layer that generates the predicted rig parameters may utilize non-linear activation functions that match possible values for the rig parameters. For example, if rig parameters are constrained to have a value between −1 and 1, a tanh activation function may be utilized in the output neural network layer. In some implementations, the neural network layers may not include normalization layers.

Rig parameters 203 for a facial animation rig are generated as output of the machine-learned inverse rig model 202. The facial animation rig provides controls for animating facial expressions. By being trained with mesh losses, as will be described in greater detail in relation to FIG. 3, the machine-learned inverse rig model 202 outputs appropriate rig parameters 203 such that when the rig parameters 203 are applied to the facial animation rig, the resulting mesh closely matches the facial mesh 201.

The rig parameters 203 may be output by the machine-learned inverse rig model 202 in a vector format and may be stored in any suitable format. For example, the rig parameters 203 may be stored as a file associating the rig parameter controls with their determined values.

FIG. 3 illustrates an example method 300 for training an inverse rig model 302 using a forward rig model 304. The goal for the inverse rig model 302 during training is to generate appropriate rig parameters 303 for a target facial mesh 301 such that, when the rig parameters 303 are applied to a facial animation rig, the resulting facial mesh closely matches the target facial mesh 301. The training uses a forward rig model 304 that functions as the facial animation rig, while being differentiable, thereby allowing gradient information to flow from the mesh loss 306 to the inverse rig model 302.

The method 300 receives one or more training examples, each training example comprising a target facial mesh 301. The training examples may be generated in any appropriate manner. As no ground-truth rig parameters are required to train the inverse rig model 302, the training examples can include any appropriate target facial mesh 301. For example, the target facial mesh 301 may be obtained from capture data of a real-world face. Additionally or alternatively, target facial meshes 301 can be obtained from facial animations which were generated without using a facial animation rig. As one example, target facial meshes 301 can be generated by randomly combining blend shapes. This may lead to a wider variety of target facial meshes 301 being used for training the inverse rig model 302, since facial animation rigs generally constrain the way in which blend shapes can be combined. Training the inverse rig model 302 using a wider variety of target facial meshes 301 may lead to better generalization, enabling the inverse rig model 302 to determine appropriate rig parameters for unseen facial meshes.

As described in relation to FIG. 2, the inverse rig model 302 processes the target facial mesh 301 (or data derived therefrom, such as blend shape weights) in accordance with a current set of parameters and generates predicted rig parameters 303.

The forward rig model 304 processes the predicted rig parameters 303 and generates a predicted facial mesh 305 (or data used to generate a predicted facial mesh 305). The predicted facial mesh 305 describes the surface shape of a face in a three-dimensional space, defining the position/configuration of various facial elements such as noses, eyes, ears, mouths, lips, jaws, and skin. For example, the predicted facial mesh 305 may include a plurality of vertex positions of a three-dimensional facial model. The plurality of vertex positions may be specified as vertex coordinates or as displacements of the vertices from their positions in a default/neutral facial mesh. For example, the default/neutral facial mesh may portray a neutral expression for the face.

The predicted facial mesh 305 may be represented in the form of a matrix or a vector. For example, the predicted facial mesh 305 may specify a three-dimensional coordinate for N vertices, and thus be represented as a matrix of dimension N×3. Alternatively, the predicted facial mesh 305 may be represented as a vector of length 3N.

In some implementations, the forward rig model 304 may output blend shape weights which are used to generate the predicted facial mesh 305. For example, the forward rig model 304 may output a vector, w, of length M with the $m^{th}$ element, $w_m$, specifying a weight for the $m^{th}$ blend shape $b^{(m)}$. A default/neutral blend shape may be indicated by $b^{(0)}$. A collection of M blend shapes $b^{(1)}, \ldots, b^{(M)}$ may be represented as a matrix $B=[b^{(1)}, \ldots, b^{(M)}]$ of dimension 3N×M, where each blend shape includes vertex positions for N vertices. A vector representation for the predicted facial mesh 305, $\hat{f}$, can be determined as $\hat{f}=b^{(0)}+Bw$. The vector representation of the predicted facial mesh 305 may be converted into a matrix representation.

The forward rig model 304 may comprise a machine-learned model that has been trained to generate predicted facial meshes 305 from predicted rig parameters 303, thereby approximating the facial animation rig. In these implementations, the forward rig model 304 may be trained prior to the training 300 of the inverse rig model 302.

In these implementations, the forward rig model 304 may comprise a neural network comprising a plurality of neural network layers, each neural network layer associated with a set of weights. The neural network layers may include fully connected layers, convolutional layers, Transformer encoders/decoders, etc. A ReLU activation function may be used for hidden layers of the neural network. An output neural network layer that generates the predicted facial mesh (or blend shape weights) may utilize non-linear activation functions that match possible values for the rig parameters. For example, if the forward rig model 304 outputs blend shape weights that are constrained to have a value between 0 and 1, a sigmoid activation function may be utilized in the output neural network layer. In some implementations, the neural network layers may not include normalization layers.

Additionally or alternatively, the forward rig model 304 may comprise a differentiable function that has been obtained/extracted from the facial animation rig. For example, the logic of the facial animation rig that transforms rig parameters to meshes may be analyzed to determine the operations that perform the transformation. The operations may be converted into a sequence of differentiable subfunctions. The differentiable subfunctions may include parameterized linear/affine transformations, and the parameters of the transformations may be determined from the logic of the facial animation rig.

The target facial mesh 301 and the predicted facial mesh 305 are compared to determine a mesh loss 306. The mesh loss 306 may compare vertex information represented in both the target facial mesh 301 and the predicted facial mesh 305. For example, the target facial mesh 301 and the predicted facial mesh 305 may each specify vertex information, such as coordinates, for each of N vertices. A distance (e.g. Euclidean distance), or error (e.g. mean squared error, root mean squared error) may be computed between pairs of corresponding vertices in the target facial mesh 301 and the predicted facial mesh 305. The mesh loss 306 may be computed using the computed distances/errors, e.g. by averaging the distances/errors of all the vertices.

For example, a mesh loss 306, $\mathcal{L}_m$ may be computed as:

$$\mathcal{L}_m = \frac{1}{N}\sum_{i=1}^{N}\left|f^{(i)} - \hat{f}^{(i)}\right|$$

In the above equation, $f^{(i)}$ represents vertex information (e.g. coordinate) for the $i^{th}$ vertex as specified in the target facial mesh 301. Similarly, $\hat{f}^{(i)}$ represents vertex information (e.g. coordinate) for the $i^{th}$ vertex as specified in the predicted facial mesh 305.

The use of a differentiable forward rig model 304 (e.g. as a machine-learning model and/or a differentiable function) allows gradient information to flow from the mesh loss 306 to the inverse rig model 302. As a result, the inverse rig model 302 is trained to generate appropriate rig parameters 303 from which accurate meshes can be generated.

Further losses may be determined when updating parameters of the inverse rig model 302. For example, a continuity loss may be used to encourage the inverse rig model 302 to generate similar outputs (predicted rig parameters 303) for similar inputs (target facial meshes 301). This may be achieved by noise augmentation. Noise augmentation involves perturbing target facial mesh 301 with the addition of noise (e.g. Gaussian noise). The perturbed target facial mesh may be processed by the inverse rig model 302 to generate predicted perturbed rig parameters. The target facial mesh 301 and perturbed target facial mesh may be processed by the inverse rig model 302 at the same time. The continuity loss may be based on a ratio of: (i) a difference between the predicted rig parameters 303 and the perturbed predicted rig parameters, to (ii) a difference between the target facial mesh 301 and the perturbed facial mesh. The continuity loss may be used to generate an inverse rig model 302 that generates smooth outputs by encouraging this ratio to be bounded.

The mesh loss 306, and if used, continuity loss, are used to form an objective function that is optimized during training of the inverse rig model 302. For example, the mesh loss and continuity loss may be weighted and summed together to form an objective function. The parameters of the inverse rig model 302 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process involves a number of training iterations, and may be terminated when one or more training criteria have been satisfied. The training criteria may be based on a number of training iterations, a current accuracy of the inverse rig model (e.g. as evaluated on a validation/test set), or any other suitable criteria.

For illustrative purposes, the method 300 displayed in FIG. 3 shows the training of inverse rig model 302 using a single training example, however it will be appreciated that any appropriate number of training examples may be processed (e.g. in batch) for training the inverse rig model 302.

The inverse rig model 302 may be trained for an "offline" use to optimize for the training examples. In these settings, the inverse rig model 302 may be discarded after the training is complete and rig parameters 303 have been generated for all of the target facial meshes 301. By optimizing for the training set, the inverse rig model 302 is trained to generate appropriate rig parameters 303 for the target facial meshes 301 of the training examples. Therefore, the resulting facial meshes generated using the rig parameters 303 closely match the target facial meshes 301 of the training examples.

As another example, the inverse rig model 302 may be trained for "online" use. In these settings, all of the target facial meshes for which rig parameters are desired might not be provided before the training of the inverse rig model 302. The inverse rig model 302 may be trained to generalize well so that appropriate rig parameters 303 can be determined for "unseen" target facial meshes (i.e. target facial meshes that were not present in the training set used to train the inverse rig model). This may be achieved by using a training set comprising a large variety of possible facial meshes 301.

FIG. 4 illustrates an example method 400 for training a forward rig model 404, wherein the forward rig model 404 comprises a machine-learning model. The goal for the forward rig model 404 during training is to approximate a facial animation rig. This is achieved using training examples 401 that each comprise a target facial mesh 402 and corresponding rig parameters 403 that can be applied to the animation rig to generate the target facial mesh 402.

The method 400 receives one or more training examples 401, each training example comprising a target facial mesh 402 and corresponding rig parameters 403. The training examples 401 may be generated in any appropriate manner. For example, a set of randomized rig parameters may be obtained, and facial meshes generated by the facial animation rig using the randomized rig parameters may be used to form the training examples 401. Randomized rig parameters may be generated by randomly selecting rig parameter controls (e.g. only selecting a certain number/percentage of rig parameter controls) and setting their values randomly within a range.

The forward rig model 404 processes the rig parameters 403 and generates a predicted facial mesh 405 (or data used to generate a predicted facial mesh 405). The predicted facial mesh 405 describes the surface shape of a face in a three-dimensional space, defining the position/configuration of various facial elements such as noses, eyes, ears, mouths, lips, jaws, and skin. For example, the predicted facial mesh 405 may include a plurality of vertex positions of a three-dimensional facial model. The plurality of vertex positions may be specified as vertex coordinates or as displacements of the vertices from their positions in a default/neutral facial mesh. For example, the default/neutral facial mesh may portray a neutral expression for the face.

The predicted facial mesh 405 may be represented in the form of a matrix or a vector. For example, the predicted facial mesh 405 may specify a three-dimensional coordinate for N vertices, and thus be represented as a matrix of dimension N×3. Alternatively, the predicted facial mesh 405 may be represented as a vector of length 3N.

In some implementations, the forward rig model 404 may output blend shape weights which are used to generate the predicted facial mesh 405. For example, the forward rig model 404 may output a vector, w, of length M with the $m^{th}$ element, $w_m$, specifying a weight for the $m^{th}$ blend shape $b^{(m)}$. A default/neutral blend shape may be indicated by $b^{(0)}$. A collection of M blend shapes $b^{(1)}, \ldots, b^{(M)}$ may be represented as a matrix $B=[b^{(1)}, \ldots, b^{(M)}]$ of dimension 3N×M, where each blend shape includes vertex positions for N vertices. A vector representation for the predicted facial mesh 405, $\hat{f}$, can be determined as $\hat{f}=b^{(0)}+Bw$. The vector representation of the predicted facial mesh 405 may be converted into a matrix representation.

The target facial mesh 402 and the predicted facial mesh 405 are compared to determine a mesh loss 406. The mesh loss 406 may compare vertex information represented in both the target facial mesh 402 and the predicted facial mesh 405. For example, the target facial mesh 402 and the predicted facial mesh 405 may each specify vertex information, such as coordinates, for each of N vertices. A distance (e.g. Euclidean distance), or error (e.g. mean squared error, root mean squared error) may be computed between pairs of corresponding vertices in the target facial mesh 402 and the predicted facial mesh 405. The mesh loss 406 may be computed using the computed distances/errors, e.g. by averaging the distances/errors of all the vertices. For example, a mesh loss 406, $\mathcal{L}_m$ may be computed as:

$$\mathcal{L}_m = \frac{1}{N}\sum_{i=1}^{N}\left|f^{(i)} - \hat{f}^{(i)}\right|$$

In the above equation, $f^{(i)}$ represents vertex information (e.g. coordinate) for the $i^{th}$ vertex as specified in the target facial mesh 402. Similarly, $\hat{f}^{(i)}$ represents vertex information (e.g. coordinate) for the $i^{th}$ vertex as specified in the predicted facial mesh 405.

The mesh loss 406 is used to form an objective function that is optimized during training of the forward rig model 404. The parameters of the forward rig model 404 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process involves a number of training iterations, and may be terminated when one or more training criteria have been satisfied. The training criteria may be based on a number of training iterations, a current accuracy of the forward rig model (e.g. as evaluated on a validation/test set), or any other suitable criteria.

For illustrative purposes, the method 400 displayed in FIG. 3 shows the training of forward rig model 404 using a single training example, however it will be appreciated that any appropriate number of training examples may be processed (e.g. in batch) for training the forward rig model 404.

After training is complete, the trained forward rig model 404 may be used for training an inverse rig model, as described in relation to FIG. 3. Furthermore, a trained forward rig model 404 may be provided, e.g. as part of a gaming application, to decompress rig parameters and generate corresponding facial meshes.

Figure 5:
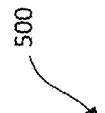
FIG. 5 illustrates an example facial mesh generated using rig parameters determined by a machine-learned inverse rig model.
Figure 5:
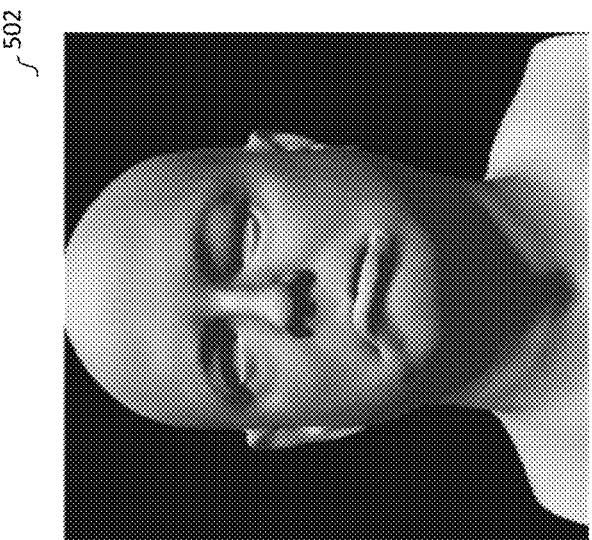
Figure 5:
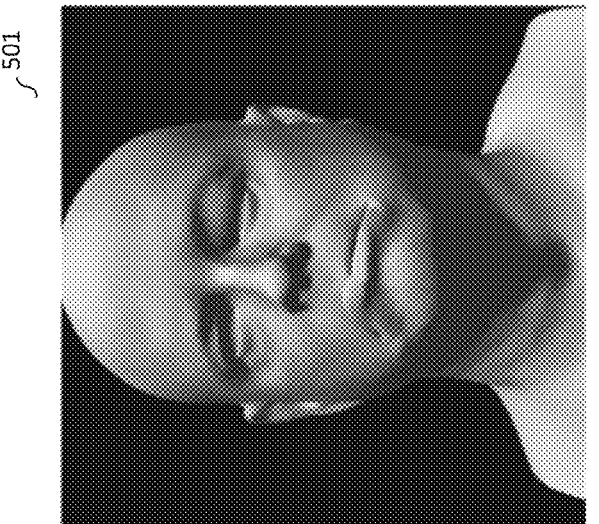

FIG. 5 illustrates an example facial mesh 502 generated using rig parameters determined by a machine-learned inverse rig model. A comparison 500 is illustrated, comparing a noisy facial mesh 501 to the resulting facial mesh 502 from denoising the facial mesh 501 using the machine-learned inverse rig model. In particular, the machine-learned inverse rig model processes the noisy facial mesh 501 and generates predicted rig parameters. The predicted rig parameters are applied to a facial animation rig to generate the denoised facial mesh 502. The denoising can be seen by comparing particular regions of the facial meshes, such as the lip region, where the denoised facial mesh 502 shows a more plausible facial mesh than the noisy facial mesh 501. Noisy facial meshes 501 can be obtained from a variety of sources, e.g. from capture data of a real-world face, from animation data of a face that has been generated without using a facial animation rig, etc. Thus, the machine-learned inverse rig model can be used to enhance the quality of meshes obtained from a variety of sources, for example by denoising noisy meshes.

Figure 6:
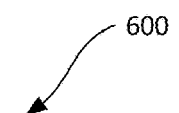
FIG. 6 is a flow diagram illustrating an example method for generating a machine-learned inverse rig model.

FIG. 6 is a flow diagram illustrating an example method 600 for generating a machine-learned inverse rig model. The machine-learned inverse rig model outputs rig parameters for an animation rig used to generate animations of a video game object. In some implementations, the animation rig may be a facial animation rig used to generate animations of facial expressions in video games. The machine-learned inverse rig model may comprise a neural network. In some implementations, the neural network does not include any normalization layers.

In step 6.1, one or more training examples are received. Each training example comprises target mesh data for a video game object, where the target mesh data specifies a configuration of the shape of the video game object. For example, the target mesh data may be for a face portraying a particular facial expression. The target mesh data of one or more training examples may be obtained from capture data of a real face.

Step 6.2 comprises steps 6.2.1-6.2.3 which are performed for each training example.

In step 6.2.1, predicted rig parameters are generated using the inverse rig model, comprising processing the target mesh data of the training example. Generating predicted rig parameters using the inverse rig model may comprise determining target blend shape weights for the target mesh data. Each target blend shape weight may be associated with a particular blend shape. A weighted sum of the blend shapes using the target blend shape weights may represent/form the target mesh data. The target blend shape weights may be processed using the inverse rig model to generate the predicted rig parameters.

In step 6.2.2, predicted mesh data is generated, comprising processing the predicted rig parameters using a forward rig model. Generating predicted mesh data may comprise processing the predicted rig parameters using the forward rig model to generate predicted blend shape weights for the blend shapes. The predicted mesh data may be generated using a weighted sum of the blend shapes. This may comprise weighting each blend shape by a respective weight of the predicted blend shape weights and summing together the weighted blend shapes.

In some implementations, the forward rig model comprises a machine-learned model that has been trained to generate mesh data from input rig parameters. The forward rig model may comprise a neural network. In some implementations, the neural network does not include any normalization layers.

The forward rig model may be trained by receiving one or more initial training examples. Each initial training example may comprise: (i) input rig parameters, and (ii) associated target mesh data for the input rig parameters. The input rig parameters define a configuration of the animation rig corresponding to the target mesh data. For each initial training example predicted mesh data may be generated, comprising processing the input rig parameters using the forward rig model. A loss may be determined, comprising performing a comparison between the predicted mesh data and the target mesh data. Parameters of the forward rig model may be updated based on the losses of one or more initial training examples.

The forward rig model may comprise a differentiable function. The differentiable function may be obtained by extracting, from the animation rig, operations used to transform the rig parameters into mesh data. The operations may be converted into a sequence of differentiable subfunctions.

In step 6.2.3, a loss is determined, comprising performing a comparison between the predicted mesh data and the target mesh data. Each of the target mesh data and the predicted mesh data may comprise vertex data, the vertex data comprising co-ordinate information for each of a plurality of corresponding vertices. Determining a loss for each training example may comprise determining a mesh loss. Determining a mesh loss may comprise determining a distance between each pair of vertices that correspond to each other in the target mesh data and the predicted target mesh data.

Determining a loss may further comprise determining a continuity loss, and the loss may be based on a combination of the mesh loss and the continuity loss. Determining a continuity loss may comprise generating perturbed target mesh data. This may comprise perturbing the target mesh data with noise. Perturbed predicted rig parameters may be generated, comprising processing the perturbed target mesh data using the inverse rig model. The continuity loss may be determined based on: (i) a comparison between the perturbed predicted rig parameters and the predicted rig parameters, and (ii) a comparison between the perturbed target mesh data and the target mesh data.

In step 6.3, the inverse rig model is trained, comprising updating parameters of the inverse rig model based on the losses of one or more training examples.

The method 600 may further comprise performing a plurality of training iterations using the one or more training examples to obtain a trained inverse rig model. Rig parameters may be determined for each training example by processing the target mesh data of the training example using the trained inverse rig model. The determined rig parameters of each training example may be stored. One or more inputs for the trained inverse rig model may be received. Each input may comprise target mesh data for a video game object, where the target mesh data specifies a configuration of the shape of the video game object. Rig parameters may be determined for each input by processing the target mesh data of the input using the trained inverse rig model. The determined rig parameters of each input may be stored.

Figure 7:
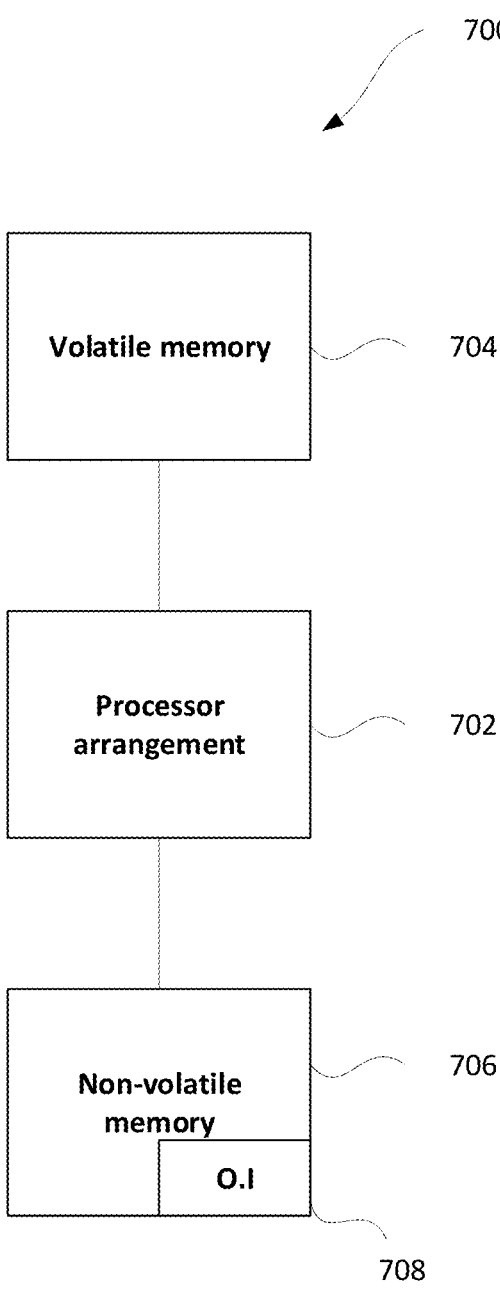
FIG. 7 shows a schematic example of a system/apparatus for performing any of the methods described herein.

FIG. 7 shows a schematic example of a system/apparatus 700 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 700 comprises one or more processors 702. The one or more processors control operation of other components of the system/apparatus 700. The one or more processors 702 may, for example, comprise a general purpose processor. The one or more processors 702 may be a single core device or a multiple core device. The one or more processors 702 may comprise a central processing unit (CPU) or a graphical processing unit (GPU). Alternatively, the one or more processors 702 may comprise specialised processing hardware, for instance a RISC processor or programmable hardware with embedded firmware. Multiple processors may be included.

The system/apparatus comprises a working or volatile memory 704. The one or more processors may access the volatile memory 704 in order to process data and may control the storage of data in memory. The volatile memory 704 may comprise RAM of any type, for example Static RAM (SRAM), Dynamic RAM (DRAM), or it may comprise Flash memory, such as an SD-Card.

The system/apparatus comprises a non-volatile memory 706. The non-volatile memory 706 stores a set of operation instructions 708 for controlling the operation of the processors 702 in the form of computer readable instructions. The non-volatile memory 706 may be a memory of any kind such as a Read Only Memory (ROM), a Flash memory or a magnetic drive memory.

The one or more processors 702 are configured to execute operating instructions 708 to cause the system/apparatus to perform any of the methods described herein. The operating instructions 708 may comprise code (i.e. drivers) relating to the hardware components of the system/apparatus 700, as well as code relating to the basic operation of the system/apparatus 700. Generally speaking, the one or more processors 702 execute one or more instructions of the operating instructions 708, which are stored permanently or semi-permanently in the non-volatile memory 706, using the volatile memory 704 to temporarily store data generated during execution of said operating instructions 708.

Implementations of the methods, apparatus and/or systems as described herein may be realised as in digital electronic circuitry, integrated circuitry, specially designed ASICs (application specific integrated circuits), system-on-chip (SoC) integrated circuitry, computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 7, cause the computer to perform one or more of the methods described herein.

Implementations of the methods, apparatus and/or systems as described herein may be realised as one or more servers, a plurality of servers and/or computing devices, a distributed system, a cloud-based platform and/or cloud computing system and the like. Thus, for instance, several computing devices and/or servers may be in communication by way of a network connection and may collectively perform tasks described as being performed by the methods, apparatus, computing devices, and/or systems as described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method for generating a machine-learned inverse rig model, wherein the machine-learned inverse rig model outputs rig parameters for a facial animation rig used to generate animations of facial expressions in video games, the method comprising:
   receiving one or more training examples, each training example comprising target mesh data for a face portraying a particular facial expression;
   for each training example:
      generating predicted rig parameters using an inverse rig model, comprising processing the target mesh data of the training example;
      generating predicted mesh data, comprising processing the predicted rig parameters using a forward rig model; and
      determining a loss, comprising performing a comparison between the predicted mesh data and the target mesh data; and
   training the inverse rig model, comprising updating parameters of the inverse rig model based on the losses of one or more training examples,
   wherein the forward rig model comprises a machine-learned model that has been trained to generate mesh data from input rig parameters, and wherein the forward rig model was trained by:
      receiving one or more initial training examples, each initial training example comprising: (i) input rig parameters, and (ii) associated target mesh data for the input rig parameters, wherein the input rig parameters define a configuration of the facial animation rig corresponding to the target mesh data;
      for each initial training example:
         generating the predicted mesh data, comprising processing the input rig parameters using the forward rig model; and
         determining a loss, comprising performing a comparison between the predicted mesh data and the target mesh data; and
      updating parameters of the forward rig model based on the losses of one or more initial training examples.

2. The method of claim 1, wherein the target mesh data of one or more training examples are obtained from capture data of a real face.

3. The method of claim 1, wherein the inverse rig model and/or forward rig model comprises a neural network without any normalization layers.

4. The method of claim 1, further comprising:
   performing a plurality of training iterations using the one or more training examples to obtain a trained inverse rig model;
   determining, for each training example, rig parameters by processing the target mesh data of the training example using the trained inverse rig model; and
   storing the determined rig parameters of each training example.

5. The method of claim 1, further comprising:
   performing a plurality of training iterations using the one or more training examples to obtain a trained inverse rig model;
   receiving one or more inputs for the trained inverse rig model, each input comprising target mesh data for a face portraying a particular facial expression;

determining, for each input, rig parameters by processing the target mesh data of the input using the trained inverse rig model; and storing the determined rig parameters of each input.

6. The method of claim 1, wherein each of the target mesh data and the predicted mesh data comprise vertex data, the vertex data comprising co-ordinate information for each of a plurality of corresponding vertices.

7. The method of claim 6, wherein determining a loss for each training example comprises:

determining a mesh loss, comprising determining a distance between each pair of vertices that correspond to each other in the target mesh data and the predicted target mesh data;

determining a continuity loss, comprising:

generating perturbed target mesh data, comprising perturbing the target mesh data with noise;

generating perturbed predicted rig parameters, comprising processing the perturbed target mesh data using the inverse rig model; and determining the continuity loss based on: (i) a comparison between the perturbed predicted rig parameters and the predicted rig parameters, and (ii) a comparison between the perturbed target mesh data and the target mesh data; and determining the loss based on a combination of the mesh loss and the continuity loss.

8. The method of claim 1, wherein, for each training example, generating predicted rig parameters using the inverse rig model comprises:

determining target blend shape weights for the target mesh data, each target blend shape weight being associated with a particular blend shape, wherein a weighted sum of the blend shapes using the target blend shape weights represents the target mesh data; and processing the target blend shape weights using the inverse rig model to generate the predicted rig parameters.

9. The method of claim 8, wherein, for each training example, generating predicted mesh data comprises:

processing the predicted rig parameters using the forward rig model to generate predicted blend shape weights for the blend shapes; and generating the predicted mesh data using a weighted sum of the blend shapes, comprising weighting each blend shape by a respective weight of the predicted blend shape weights and summing together the weighted blend shapes.

10. A computing system comprising one or more computing devices configured to:

receive one or more training examples, each training example comprising target mesh data for a video game object, wherein the target mesh data specifies a configuration of a shape of the video game object;

for each training example:

generate predicted rig parameters using an inverse rig model, comprising processing the target mesh data of the training example;

generate predicted mesh data, comprising processing the predicted rig parameters using a forward rig model, wherein each of the target mesh data and the predicted mesh data comprise vertex data, the vertex data comprising co-ordinate information for each of a plurality of corresponding vertices; and determine a loss, comprising performing a comparison between the predicted mesh data and the target mesh data, wherein determining a loss for each training example comprises determining a mesh loss, comprising determining a distance between each pair of vertices that correspond to each other in the target mesh data and the predicted target mesh data; and train the inverse rig model, comprising updating parameters of the inverse rig model based on the losses of one or more training examples.

11. The computing system of claim 10, wherein the target mesh data of one or more training examples are obtained from capture data of a real-world object.

12. A computer-implemented method for enhancing mesh data specifying the shape of at least a part of video game object, comprising generating predicted rig parameters based on the mesh data, using a machine-learned inverse rig model, and generating enhanced mesh data based on the predicted rig parameters, wherein the machine-learned inverse rig model has been trained to generate rig parameters for an animation rig, and the enhanced mesh data is generated by applying the predicted rig parameters to the animation rig.

13. The method of claim 12, wherein the mesh data is for a face portraying a particular facial expression.

14. A computer-implemented method for generating a machine-learned inverse rig model, wherein the machine-learned inverse rig model outputs rig parameters for a facial animation rig used to generate animations of facial expressions in video games, the method comprising:

receiving one or more training examples, each training example comprising target mesh data for a face portraying a particular facial expression;

for each training example:

generating predicted rig parameters using an inverse rig model, comprising processing the target mesh data of the training example;

generating predicted mesh data, comprising processing the predicted rig parameters using a forward rig model, wherein the forward rig model comprises a differentiable function obtained by:

extracting, from the facial animation rig, operations used to transform the rig parameters into mesh data; and converting the operations into a sequence of differentiable subfunctions; and determining a loss, comprising performing a comparison between the predicted mesh data and the target mesh data; and training the inverse rig model, comprising updating parameters of the inverse rig model based on the losses of one or more training examples.

* * * * *